United States Patent Office

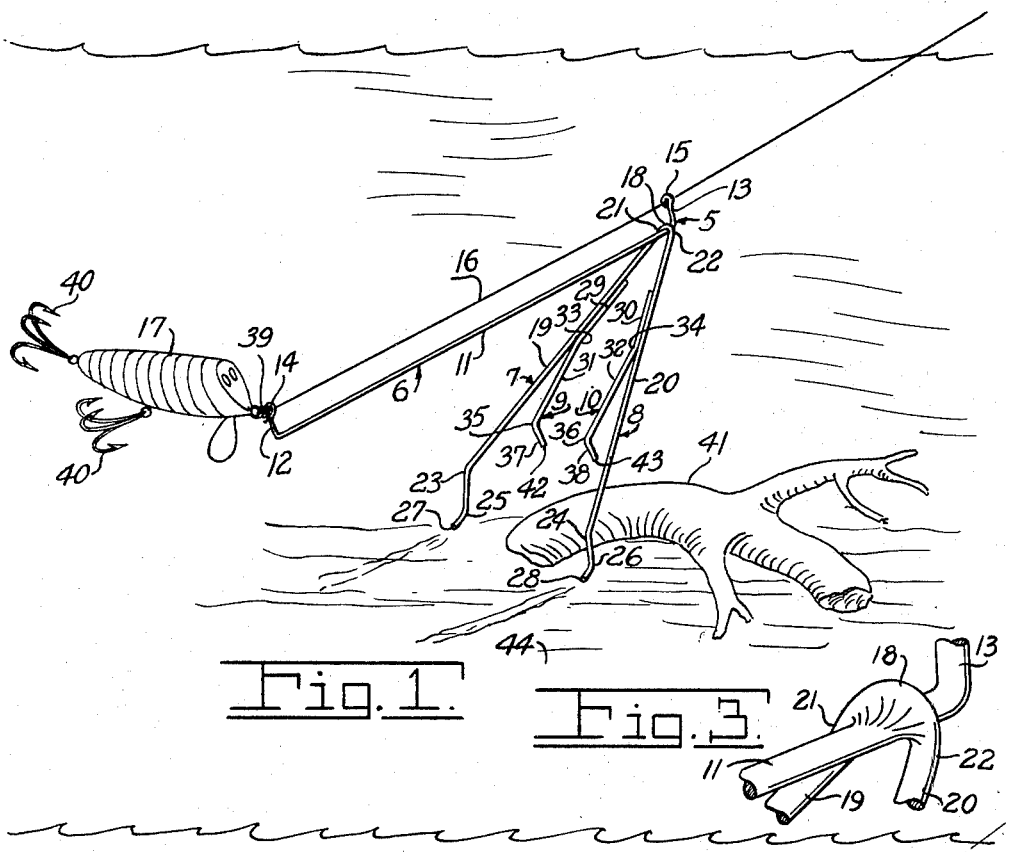
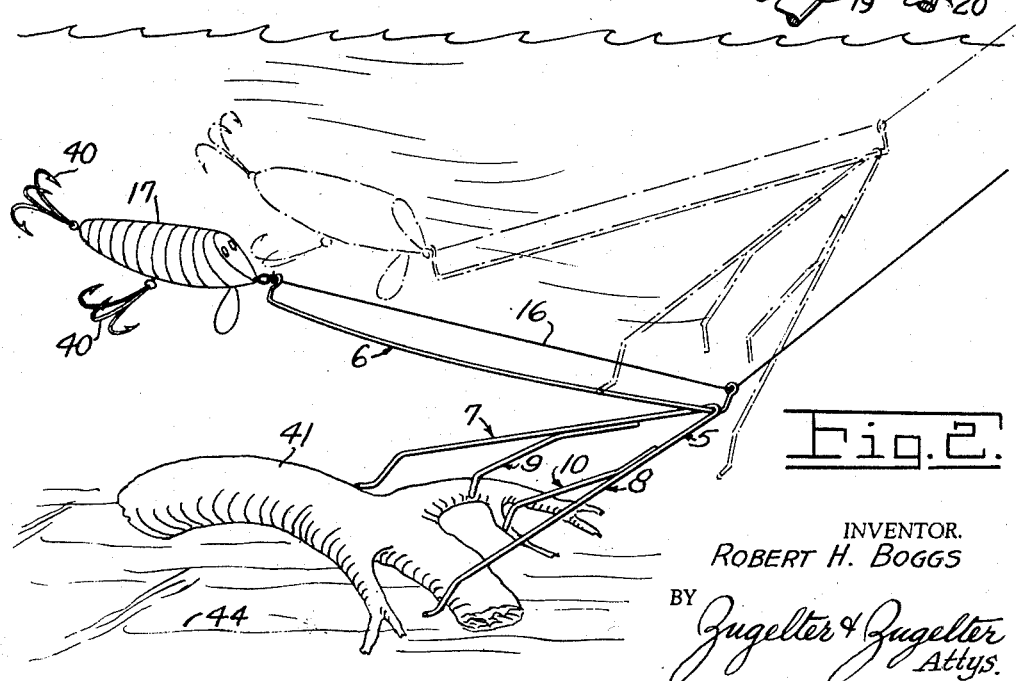

2,788,606
Patented Apr. 16, 1957

2,788,606

FISH BAIT RETURN

Robert H. Boggs, Carrollton, Ky.

Application August 15, 1956, Serial No. 604,264

3 Claims. (Cl. 43—44.97)

This invention relates to fishing tackle and more particularly to a bait return.

An object of this invention is to provide a device which may be used in conjunction with a fishing lure or bait to prevent loss thereof due to snagging of a hook, bait or lure on an inaccesible submerged obstruction, resulting in the loss thereof.

A further object of this invention is to provide a device of the above described character, which may be used with deep-running artificial lures to prevent their loss by snagging on submerged obstructions.

A further object of this invention is to provide a device of the above character which co-operates with an obstruction or snag to raise a lure or bait, to preclude snagging or loss of the lure or bait upon a snag.

A further object of this invention is to provide a device of the foregoing character which resists overturning by snags.

A further object of this invention is to provide a device of the foregoing character which is adapted to co-operatively engage snags to insure adequate line tension for proper operation of the bait return device which serves to preclude engaging of the snag by the lure used in conjunction with the device.

A further object of this invention is to provide a device of the foregoing character which may be used in conjunction with a lure having the most effective fish-catching conventional hook in waters having snags.

A further object of this invention is to provide a device of the foregoing character adapted for use with baits of a wide range in weight, including both the very light weight baits and the heavy weight baits.

A further object of this invention is to provide a device of the above character which serves to improve the cast by reason of its weight being adjacent to the bait or lure to be cast, and by reason of the fact that it substantially precludes snagging of the hook or hooks of the bait or lure upon the line adjacent the bait during execution of the cast, thus insuring entry of the bait into the water in operative condition.

A further object of this invention is to provide a device of the above character having its weight distributed in such a fashion that its dynamic balance tends to place it in the preferred operative position relative to the fish line and adjacent bait.

A further object of this invention is to provide a device of the foregoing character having an elongate boom portion adapted to cooperate with a fish line adjacent a bait secured thereto and with said fish line at least one point spaced from said first mentioned point, said boom having a pair of feeler members secured thereto adjacent the end remote from the bait and extending in diverging relation downwardly and rearwardly to compoundly curved portions which converge toward each other and extend away from the boom to the trailing free end portions to form skid-like portions adjacent the trailing ends of the feeler members, and a pair of trigger members shorter than and between said feeler members and having portions thereof projecting away from the boom and feeler members and adapted to co-operate with an obstructing snag to effect pivoting of the device thereabout to prevent engagement of the bait therewith.

A further object of this invention is to provide a device of the above character which is sturdy, long-lasting, easily transported and may be sold at a reasonable price.

The above and other objects and features of the invention will in part be apparent and in part obvious to those having ordinary skill in the art to which this invention pertains, from the following description and the accompanying drawing in which:

Figure 1 is a view in perspective of a device embodying my invention shown in co-operation with a fishing line and deep-running artificial lure, approaching an obstruction;

Fig. 2 is a view in perspective of the lure, line obstruction and bait return shown in Fig. 1 in which the bait return is cooperatively engaging the obstruction and guiding the lure so as to preclude its snagging upon the obstruction, and showing in dot-dash lines the position into which the bait return and lure move after the former moves out of engagement with the obstruction; and Fig. 3 is an enlarged fragmental view of the connection of the boom and feelers shown in Fig. 1.

The device shown in Fig. 1 is what presently appears to be the preferred form of embodiment of my invention.

The device 5 comprises a boom 6, feelers 7 and 8, and trigger members 9 and 10, joined together by any suitable means, such as solder, as shown in the drawing.

I prefer to fabricate the device 5 from a resilient wire stock. The parts of a bait return 5 constructed from such material may be temporarily distorted in a substantial amount in use without any permanent distortion.

Boom 6 comprises an elongate central portion 11 from the end of which a pair of parallel arms 12 and 13 extend perpendicularly. Arms 12, 13 terminate in ring or eyelet portions 14, 15 adapted to encircle a fish line 16 with eyelet 14 adjacent the bait or lure 17, as shown.

A pair of feelers 7, 8 are preferably formed from a single piece of stock having a curved or bent central portion 18 joining the feelers 7, 8 in an inverted V-shape unit. Curved portion 18 is adapted to straddle portion 11 of the boom adjacent arm 13. As shown in Fig. 1, curved portion 18 may lie in a plane substantially perpendicular to portion 11 while elongate portions 19 and 20 of feelers 7 and 8 are joined thereto by intermediate curved portions 21 and 22. Elongate portions 19 and 20 extend in symmetrically diverging relation from portion 18, the plane of boom portions 11, 12 and 13 being the plane of symmetry. Portions 19 and 20 also are inclined relative to boom portion 11 and extend downwardly and rearwardly from adjacent arm 13 toward the diametral plane of boom portion 11 in which the longitudinal center line of arm 12 lies. The trailing portion of each feeler 7, 8 curves downwardly at 23, 24 and then recurves at 25, 26 toward parallelism with the plane of portions 19, 20 and convergingly to the free ends 27, 28.

Trigger members 9, 10, as shown in the drawing, have portions 29, 30 secured by any suitable means, such as soldering, in parallel contacting relation to portions 19, 20 of the feelers 7, 8, respectively. Portions 31, 32 extend in substantially parallel relation to each other from the respective portions 29, 30 integral therewith. Portions 31, 32 may be coplanar with portions 19, 20 and 29, 30 or they may extend in straight or slightly curved manner from bends 33, 34 forwardly to bends 35, 36. By forwardly I mean that adjacent bends 35, 36 of portions 31, 32 are in spaced relation to the plane of portions 19, 20 which plane is disposed between those bends 35, 36 and eyelet 14. Portions 37, 38, joined to portions 31, 32 by bends 35, 36, extend away from the plane of portions 19, 20. The substantially equal angles included between portions 37, 38 and 31, 32 are right or slightly obtuse angles.

To use the bait return, the fishing line 16 is threaded through eyelet 15, eyelet 14, and attached to bait 17 by any suitable means such as knot 39. Eyelet 14 of bait return 5 rests against knot 39 under force of gravity when the bait 17 is suspended by line 16 below the tip of the fishing rod. During the back cast and the cast, additional dynamically imposed forces act to urge return 5 against knot 39. Bait 17 and return 5 are thus kept in close spaced co-operating relation during the cast and their combined mass aids in attaining longer casts. During retrieving of the bait, water resistance forces hold them in co-operating relation.

The spaced eyelets 14, 15 co-operate with the line 16 to support it, maintaining it in substantially straight condition even when slack. The eyelet 14 co-operates with adjacent portions of bait 17, substantially precluding swinging of the bait 17 into a position in which hooks 40 foul on the line 16. Thus, a successful cast of bait 17 may be made when bait return 5 is used, even though a similarly made cast without return 5 would result in fouling of hooks 40 on line 16 and placing of bait 17 in the water in inoperative condition.

The arrangement of the parts of bait return 5 give it a weight distribution which biases it toward depending operative relation from and with line 16. Thus it drops into the water in operative position at the end of a cast. The bait dropped into shallow or deep water in co-operative relation with the bait return 5 at the end of the cast, is in operative relation to return 5 and line 16, ready for the strike of a game fish or for being retrieved in an attempt to lure such a fish to strike at the bait.

As bait 17 is retrieved, return 5 immediately precedes it. During retrieving of bait 17 line 16 normally inclines upwardly from bait 17 to the tip of the fishing rod (not shown) located above water level. This inclined attitude of the line serves to regulate the position of the return 5 and boom 6, particularly portion 11 thereof is aligned with and spaced beneath the line 16. The position of the boom 6 being substantially fixed in relation to feelers 7, 8 and triggers 9, 10 serves to determine the angular relation of the feelers 7, 8 and triggers 9, 10, to line 16.

Bait 17 shown, is of the diving type, having a spoon-like diving plane and an inclined front face. As bait 17 is retrieved, its depth of travel is regulated by the speed of its movement relative to surrounding water. As an obstruction or snag 24 is approached, line 16 may run over it, or above it, until bait return 5 engages it, depending upon the elevation at which bait 17 is running relative to the elevation of the upper portion of the snag 41. Feelers 7, 8 may touch or ride over obstructions, but when an obstruction upon which hooks 40 are likely to snag, is encountered, it is engaged by the tips 42, 43 of the triggers 9, 10. They tend to grab or snag upon the obstruction 41. As the tension on line 16 increases, as a result of a fisherman retrieving more of his line, return 5 leans forward toward a position in which the plane of line 16 at eyelet 15 and the two points of contact of triggers 9, 10 with snag 41 is coincident with the line of the portion of line 16 to the right of eyelet 15 extended leftwardly, the position shown in Fig. 2. As return 5 moves from an attitude such as that shown in Fig. 1, toward or to an attitude such as that shown in Fig. 2, the attitude of boom 6 undergoes a corresponding change and eyelet 14 moves from a position of substantial alignment with the portion of line 16 to the right of eyelet 15 into a position in which it is substantially elevated above the line of the portion of line 16 to the right of eyelet 15, extended leftwardly past eyelet 15. Inasmuch as line 16 is being subjected to increasing tension incident to this change in attitude of return 5, bait 17 is drawn more firmly toward or against eyelet 14, and thus rises in conjunction with eyelet 14. In this way the bait 17 is elevated above the snag 41 and placed in a position in which it will not come in contact with that snag. As the tension of line 16 increases, portion 11 tends to bow or arch as shown in Fig. 2. Triggers 9 and 10 fabricated from resilient material bend elastically under the forces resulting from increased line tension until they disengage snag 41. Following such disengagement, line 16, return 5, and bait 17 move toward the positions shown in dot-dash lines. It may be noted that portion 11 simultaneously returns to the straightened normal condition shown in full lines in Fig. 1 and in dot-dash lines in Fig. 2 as the tension in line 16 decreases. In the latter relationship of these elements, return 5 is again in substantially the attitude illustrated in Fig. 1.

It may be further noted that bait return 5 hangs beneath line 16 and in the event that only one of the feelers 7 or 8 alone encounters an obstruction which might tend to topple the return 5 over into another attitude, the pendulous nature of its association with line 16 results in its immediate return toward a normal attitude such as is shown in Fig. 1. Further, the recurved portions 23—27 and 24—28 of feelers 7, 8 respectively, co-operatively engage the bottom 44. When device 5 is tipped to one side so that only portion 23—27 or 24—28 of the feeler on that side is in co-operative contact with the bottom 44, the co-operation tends to produce compensating repositioning of the device toward the normal attitude as shown for example in Fig. 1. Thus the device is normally urged toward the preferred operating position or attitude.

The resilient quality of the device 5 coupled with the nestability of a plurality thereof as a result of the arrangement of their parts permits economical shipping of a substantial number of the bait return devices in a modest size container. Further, eyelet portions 14, 15 and recurved portions 23—27, 24—28 of feelers 7, 8 serve to preclude portions of device working through the container wall into partially protruding position.

Having thus described the illustrated embodiment of my invention, it will be apparent to those having ordinary skill in the art to which this invention pertains, that modifications and changes may be made in the embodiment without departing from the spirit or scope of the invention.

Therefore, what I claim as new, and desire to secure by Letters Patent, is:

1. A fish bait return comprising an elongate resilient boom adapted for co-operative engagement with a fish line adjacent a trailing bait, a pair of resilient feelers secured to the boom and adapted to extend away from the line and inclined toward the bait, and at least one trigger, said trigger being intermediate said feelers and adapted to co-operatively engage an obstruction whereby the boom is swung to guide the bait away from the obstruction.

2. A bait return comprising an elongate resilient boom having a pair of coplanar arms extending angularly therefrom, each arm having a ring portion spaced from the boom, said rings being in substantially axial alignment, a pair of resilient feeler members secured to said boom adjacent one of said arms, each of said feelers extending symmetrically away from the plane of the boom and arms in obtuse angular relation to said adjacent arm, and at least one trigger member having a free end portion extending away from said boom and between said feelers to its free end, whereby the bait return may be supported on a fish line extending through said ring portions to a bait, said feelers and trigger member being adapted to co-operate with snags to preclude snagging of the bait thereon.

3. A bait return comprising an elongate resilient boom having a pair of coplanar arms extending angularly therefrom each arm having a ring portion spaced from the boom, said rings being in substantially axial alignment and adapted to co-operate with a fish line extending therethrough to a bait, a pair of feeler members joined together in V-shaped relation at and secured to the boom adjacent one of said arms, said feelers extending symmetrically away from the plane of the boom and arms in obtuse angular relation to the adjacent arm and in acute angular relation to said boom, said feeler members being adjacent their free ends compoundly curved away from the boom in mutually converging relation to the free ends thereof, and a pair of trigger members, each trigger member being secured to one of said feeler members and having free portions disposed substantially between said feelers, said trigger members each having a portion adjacent the free ends thereof extending away from the boom and including an angle of at least 90° with the remainder of said trigger member whereby said bait return co-operates with a fish line adjacent a bait and with objects upon which the bait might snag to guide the bait around said obstructions and regulates line tension when in co-operating relation with such obstructions to preclude loss of the bait by reason of fouling on obstructions.

References Cited in the file of this patent

FOREIGN PATENTS 481,460    Canada _____ Mar. 4, 1952